US007646886B2

(12) United States Patent
Chen

(10) Patent No.: US 7,646,886 B2
(45) Date of Patent: Jan. 12, 2010

(54) CLOSELY-SPACED MULTIPLE TARGETS DETECTION USING A REGIONAL WINDOW AS A DISCRIMINANT FUNCTION

(75) Inventor: Hai-Wen Chen, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 870 days.

(21) Appl. No.: 11/126,261

(22) Filed: May 11, 2005

(65) Prior Publication Data

US 2006/0257004 A1 Nov. 16, 2006

(51) Int. Cl.
*G06K 9/00* (2006.01)
(52) U.S. Cl. ...................................... 382/103
(58) Field of Classification Search ................ 382/103; 348/169–180; 342/89–158
See application file for complete search history.

(56) References Cited

FOREIGN PATENT DOCUMENTS

EP  0 334 560 A2  9/1989
WO  WO-03/079046 A1  9/2003

OTHER PUBLICATIONS

Korn et al., "Trajectory estimation of closely spaced objects (CSO) using infrared focal plane data of an STSS (Space Tracking and Surveillance System) platform," Proceedings of the SPIE—The International Society for Optical Engineering SPIE-Int. Soc. Opt. Eng USA, vol. 5428, No. 1, Aug. 2004, pp. 387-399.
Yardimci et al., "High-resolution algorithms for locating closely spaced objects via infrared focal-plane arrays," Optical Engineering USA, vol. 33, No. 10, Oct. 1994, pp. 3315-3323.
Abatzoglou et al., "Neyman-Pearson detection for CSO processing," Proceedings of the SPIE—The International Society for Optical Engineering USA, vol. 2032, Oct. 1993, pp. 223-231.
Svetlana G. Shasharina and John Cary, "An Improved Levenberg-Marquardt Solve Target Optimization," Bull. Am. Phys. Soc. 44 (7), 82 (1999).

*Primary Examiner*—Samir A. Ahmed
*Assistant Examiner*—Atiba O Fitzpatrick
(74) *Attorney, Agent, or Firm*—Birch, Stewart, Kolasch & Birch, LLP

(57) ABSTRACT

A method and system, for detecting closely spaced objects with data from an imaging sensor. A CFAR detector performs detection on the image data at a threshold level. A processor runs a first algorithm on exceedances above the CFAR threshold. The first algorithm is for single target detection and includes a local-max algorithm that identifies multiple exceedances within a 2×2 matrix of image data and only keeps exceedance with the maximum value. All other exceedances in image are single target detections. The processor runs a second algorithm that identifies multiple exceedances (single target detections) within a local regional area across the whole image. The regional area size may be a 3×3, 4×4, or 5×5 matrix depending on the specified CSO separations. This algorithm may use a regional moving window across the whole image. An alternative method using the indices of all the exceedances' (x,y) coordinates is also disclosed.

23 Claims, 8 Drawing Sheets

CLOSELY-SPACED MULTIPLE TARGETS DETECTION USING A REGIONAL WINDOW AS A DISCRIMINANT FUNCTION

BACKGROUND OF THE INVENTION

1. Field of the Invention

The present invention relates generally to unresolved target detection using an infrared focal plane array (IR FPA), and it more particularly relates to the detection of closely spaced multiple targets using a regional window as a discriminant function.

2. Description of the Related Art

In general, most current military sensors use single target detection and tracking approach. However, in many battlefield scenarios targets show up as closely-spaced pairs or groups. For example as shown in FIG. 1, air fighters 1 almost always come as a pair that includes a leading fighter and an accompanying fighter. Frequently, ballistic missiles 2 are launched in pairs or groups located in a closely-spaced area. Navy warships 3 usually move as a fleet (ship group), and army trucks and tanks 4 on a large scale battlefield move and show up in teams and groups, as shown in FIG. 1. Therefore, the capability to detect and track CSOs (Closely Spaced Objects) is critical for military sensing.

The traditional approach for CSO detection, uses a nonlinear Least Square (Levenberg-Marquardt) algorithm to detect CSOs. A prior art technique that utilizes the Levenberg-Marquardt algorithm is described in an article by Svetlana G. Shasharina and John Cary, "An Improved Levenberg-Marquardt Solver for Multiple-Target Optimization," Bull. Am. Phys. Soc. 44 (7), 82 (1999). The traditional approach for CSO detection is more of a scientific approach, and it has problems in real world applications. For example, the traditional approach needs initial guesses of target numbers, and it does not deal well with target phasing problems. Moreover, it is not guaranteed to always find the global minimum, and it requires heavy computations for large iterations that do not always converge.

Accordingly, a simpler and more reliable engineering approach for detecting CSO's is needed.

SUMMARY OF THE INVENTION

The method and system of the present invention, provides a simple and reliable approach for detecting closely spaced objects. More specifically, a sensor images a scene, and it provides image data to a processor which runs a plurality of algorithms for processing the image data. A first algorithm, having a predetermined CFAR, determines whether there are any single object detections within the scene. A second algorithm, having substantially the same predetermined CFAR and having at least a first regional window corresponding to a matrix of pixels, determines whether there are closely spaced objects within the regional window. This algorithm can be run by using a regional moving window across the whole image. The closely spaced objects detected within the regional window are recorded and reported.

DETAILED DESCRIPTION OF THE INVENTION

In order to facilitate the reader's understanding of the present invention, the following list of acronyms and their general meanings are provided:

ATR—Automatic Target Recognition
CFAR—Constant False Alarm Rate
CSOs—Closely Spaced Objects
EOTDS—Electro-Optical Targeting Demonstration System
FPA—Focal Plane Array
IR—Infrared
LS—Least-Square
Pd—Probability of Detection
Pdec—Probability of Target Detection
Pfa—Probability of False-Alarm
Pfa(Sngl) Probability of False-Detection for a Single Target
Pfa(CSO) Probability of False-Detection for a CSO Target Pair
ROC—Receiver Operating Characteristics
SNR—Signal-to-Noise Ratio
SCNR—Signal to Clutter Noise Ratio The present invention includes reliable CSO detection algorithms using a regional window (3×3 or 5×5) as a discriminant function to distinguish single targets from CSO targets. The idea behind this approach is that the chance (probability) of the false detections (caused by background clutter) to be detected as CSO targets is much lower than they are detected as single targets.

For example, for a Pfa(Sngl)=5E-4, the false detection number caused by the background clutter is 92 for a 430×430 image size. However, the 92 false detections are generally uniformly distributed among the image, and the chance that multiple false detections fall into a 3×3 or 5×5 regional window is very low. Therefore, for a specific Pd (probability of detection), Pfa(CSO) is much lower than Pfa(Sngl), which leads to a quicker/earlier CSO target declaration with a very high Pdec (probability of target declaration). In many cases, Pfa(CSO) can be as low as zero.

Figure 1:
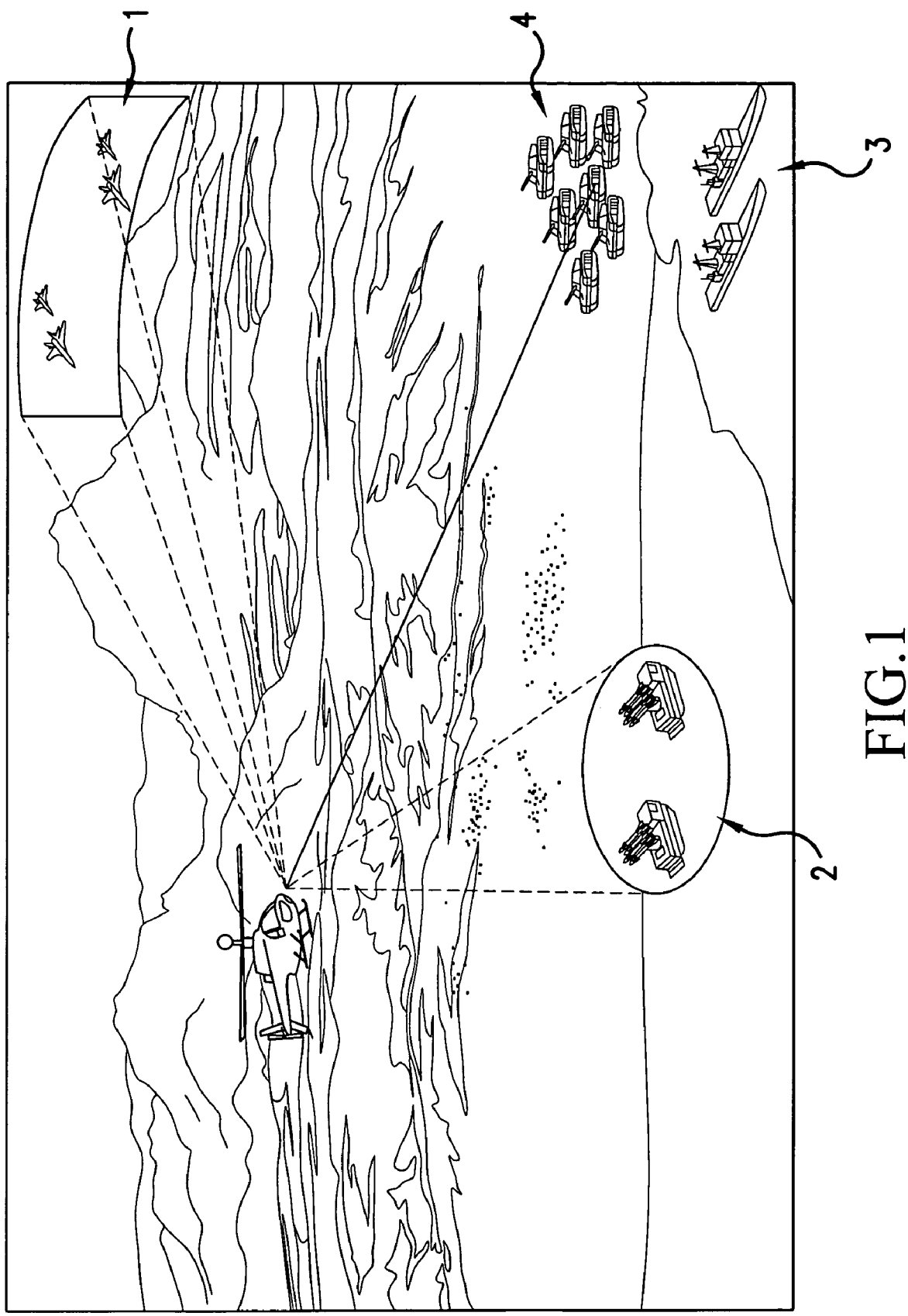
FIG. 1 is a scene illustrating different types of closely spaced objects.
Figure 2:
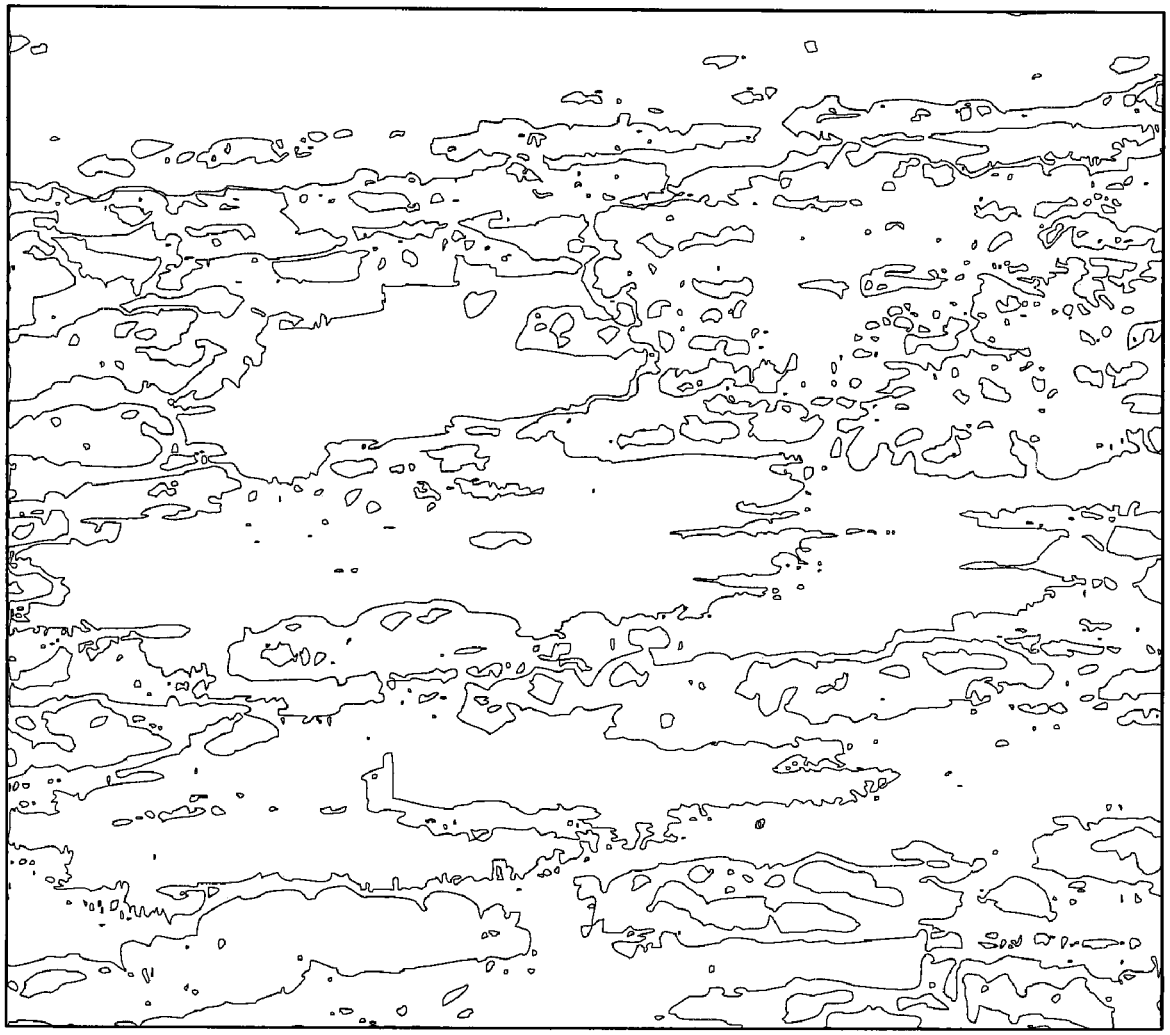
FIG. 2 is a photograph of a cloud scene.

Preliminary results were obtained using a background clutter image which included a clouds scene (collected from EOTDS flight test), of the type shown in FIG. 2. In the preliminary results, single point-source target as well as the CSO pairs were randomly inserted to the cloud background in 121 different phases. Each phase was randomly inserted 12 times. Accordingly, the total target insertion number was 121×12=1452. The inserted CSO targets were set in three different separations: 1.78, 2.0, and 2.21 pixels. The SCNR (signal to clutter noise) was about 3.2. There are alternative ways of practicing the detailed CSO detection algorithm.

Moving Window (3×3) Approach

Figure 3A:
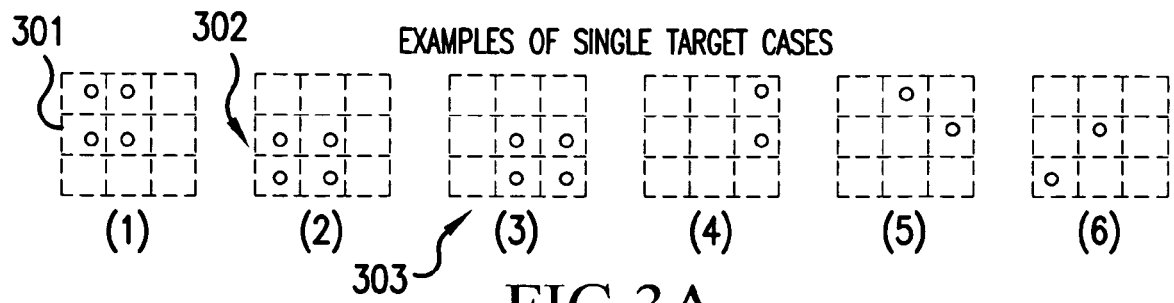
FIGS. 3A-3D are illustrations of single and CSO target cases.
Figure 3B:
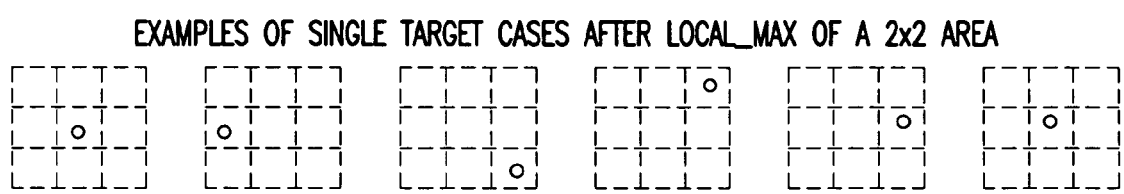
Figure 3C:
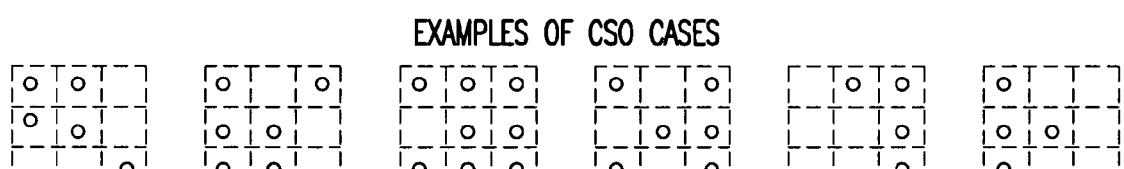
Figure 3D:
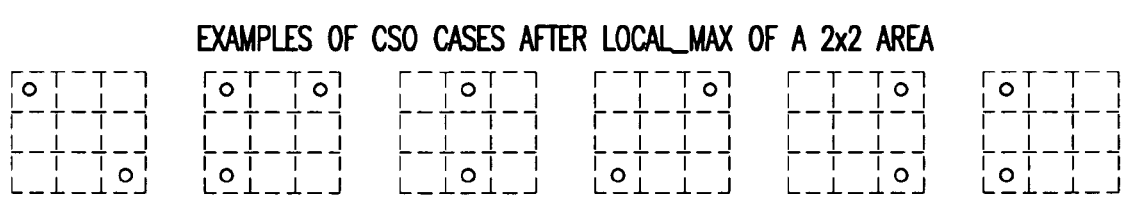

As shown in FIG. 3A, after a specific CFAR threshold, the maximum possible exceedance (above the threshold) number for a single target is four within a 2×2 pixel area. In other words, in FIGS. 3A(1), 3A(2) and 3A(3), there are four exceedances within different 2×2 pixel areas. The multiple exceedances for a single target are mainly caused by target random phasing at the pixel corners or edges. The exceedance with the maximum SNR value among the 2×2 area can be selected as the detection for the single target by running a local-max algorithm for a local 2×2 area. Therefore, as shown in FIG. 3B, there is only a single detection within a 3×3 window for a single target. For CSO target-pair cases with separation between 1.5~2.5 pixels, as shown in FIG. 3C, the exceedances after a specific CFAR threshold are distributed among a 3×3 pixel area. As shown in FIG. 3D, after running the local-max algorithm, the detection number among a 3×3 widow for a CSO pair is 2 or 3. Therefore, a regional 3×3 widow can serve as a good disciminant function to distinguish a single target from a CSO target pair.

A CSO detection process using a 3×3 moving window is described as following:

1). Run the single target detection of a specific CFAR, and use the local-max algorithm to remove multiple detections in a 2×2 region;
2). Use a 3×3 moving window across the SNR image to detect CSO pairs for the same CFAR:
   i). If only zero or one detection is inside the window, it is not a CSO;
   ii). If more than one detection are inside the window, it is a CSO;
   iii). Record and report the locations of all the detections inside the window.

Figure 9:
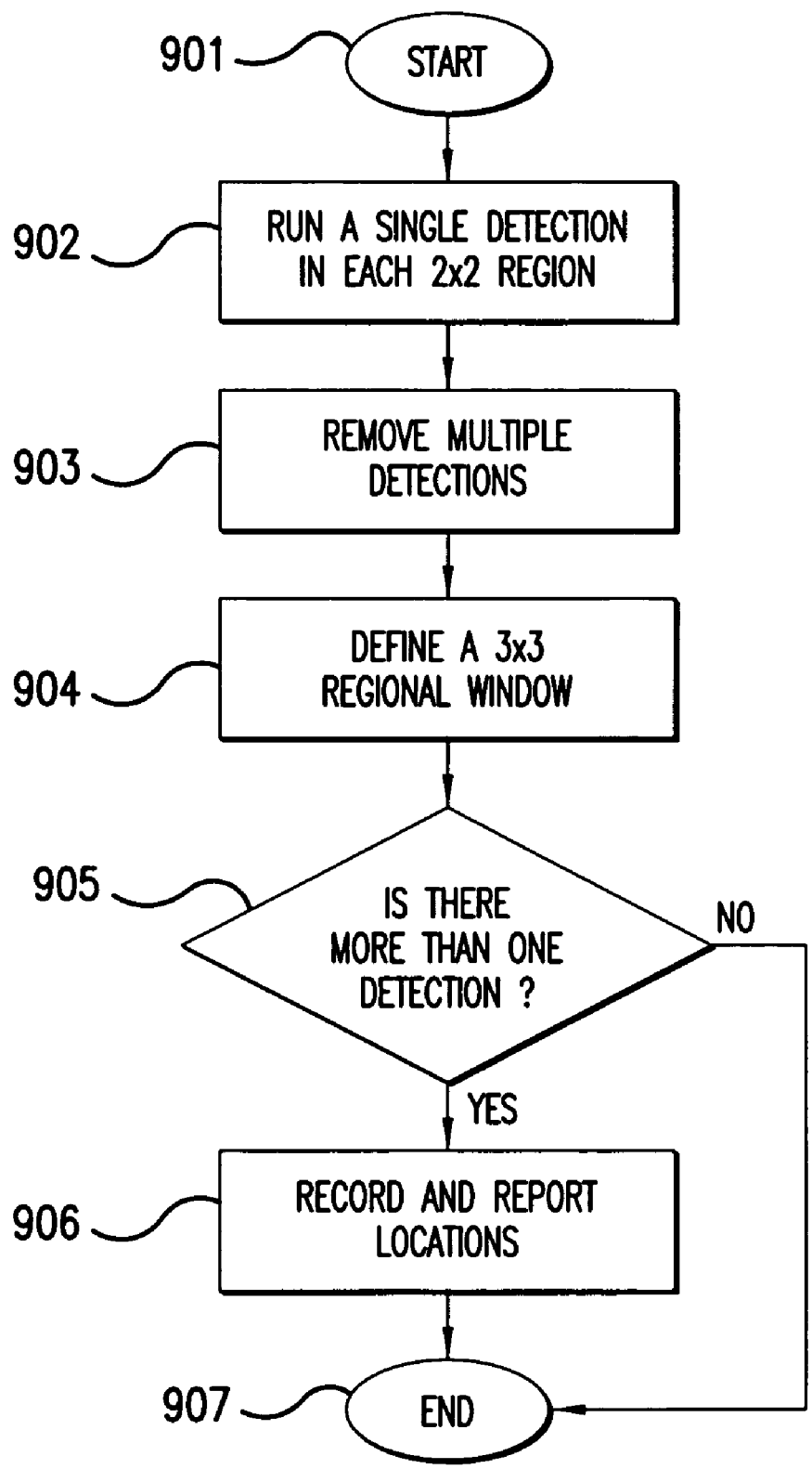
FIG. 9 is a flow chart for a regional window algorithm.

A flow chart for the CSO detection process using a 3×3 window is provided in FIG. 9. The algorithm begins with a starting step 901. In step 902 a single target detection for a specific CFAR is performed. If the there are multiple detections in a 2×2 region, then the algorithm removes the multiple detections in step 903. A regional 3×3 or a 5×5 window is defined in step 904 and it is applied an image to detect CSO pairs. If there is a determination in step 905 that there is more than one detection in the window, then the location is recorded and reported in step 906, thereby indicating the presence of CSO's. The algorithm is terminated in step 907.

An Alternative Approach by Use of Single Detection Index

Figure 4:
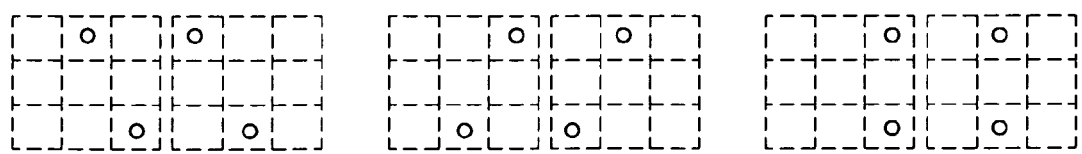
FIG. 4 is a diagram illustrating examples of repeated patterns.

There is a possible problem with the moving window approach described above. For a 3×3 window moving inside the image from left-to-right, and top-to-bottom, the left two columns of the current window are overlapped with the left previous window. The upper two rows of the current window are overlapped with the upper previous window, and thus, there are eight CSO patterns reported twice. Three of the possible eight repeated patterns are shown in FIG. 4.

Instead, an alternative approach has been developed that uses single detection index to group CSO detections. The detailed Index method is described below:

From the single target detection outputs, we have row and column locations (row, col) of all the single detections.

$Sgn\_Det(i) = Sgnl\_Det[row(i), col(i)]$, where i=1, 2, ... n, and n is the total detections for a specific CFAR.

For a 430×430 image, we sort Sgnl_Det(i) based on the values row(i) in an ascending order, e.g., row(1)=1,
row(2)=1,
row(3)=4,
row(4)=8,
. . .
. . .
row(n)=428.

All the CSOs within a 3×3 area are grouped based on the row(i) and col(i) index information. The grouping process is described here using a pseudo program code:

```
For i = 1 to n,
        j = row(i+1) – row(i);
        k = 0;
    while j < 3,
            if col(i+1+k) – col(i) < 3,
                report Sgnl_Det(i) as CSO,
                and add Sgnl_Det(i+1+k) to the CSO group;
            end
            k = k + 1,
            j = row(i+1+k) – row(i);
        end (loop for while) {comment: if j >= 3,
        then go out loop while}
end
```

The Index method is much faster than the moving window method, and guarantees that no CSO pattern is repeatedly counted.

Preliminary Performance Results

Figure 5:
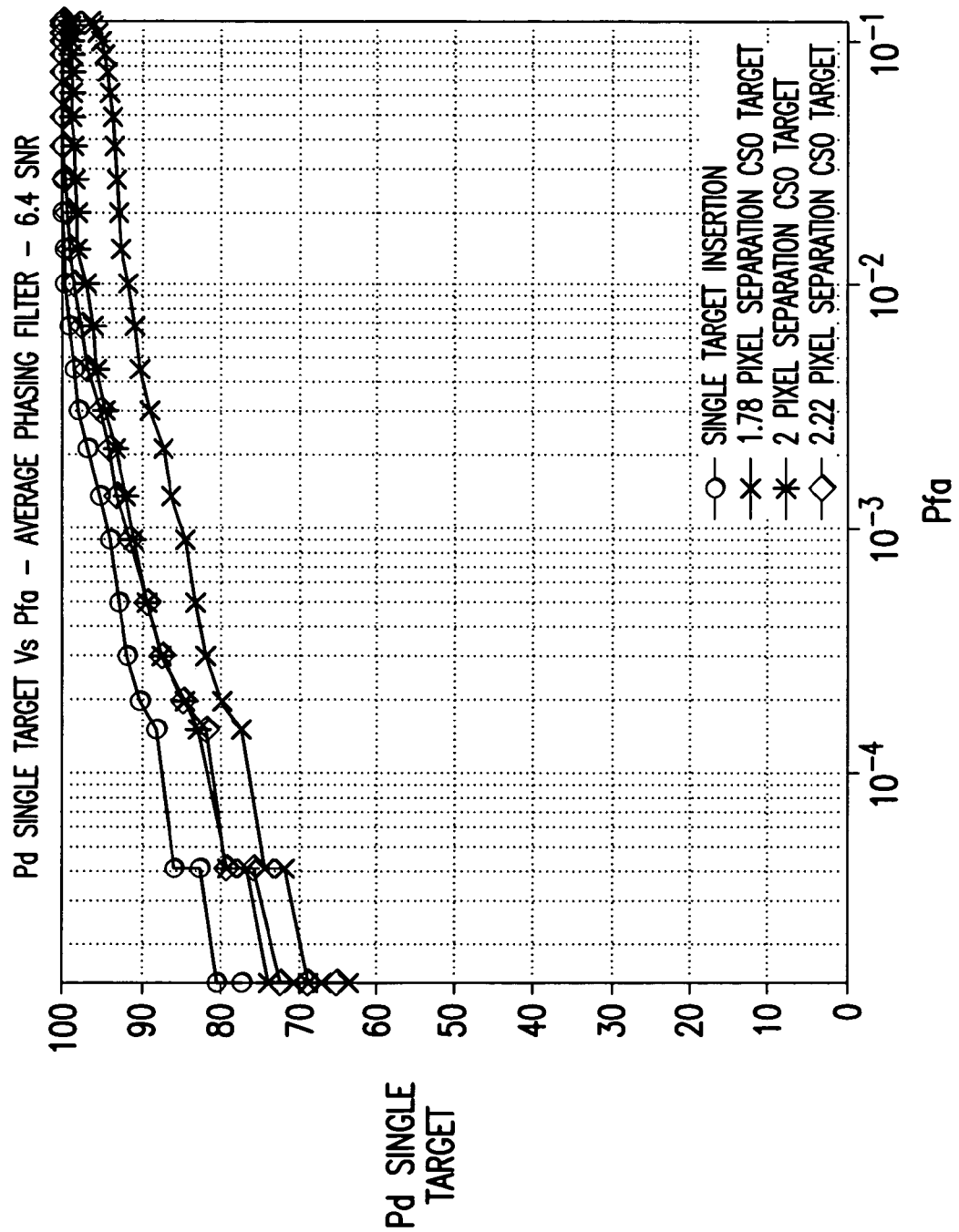
FIG. 5 is a graph illustrating ROC performance of single target detection.
Figure 6:
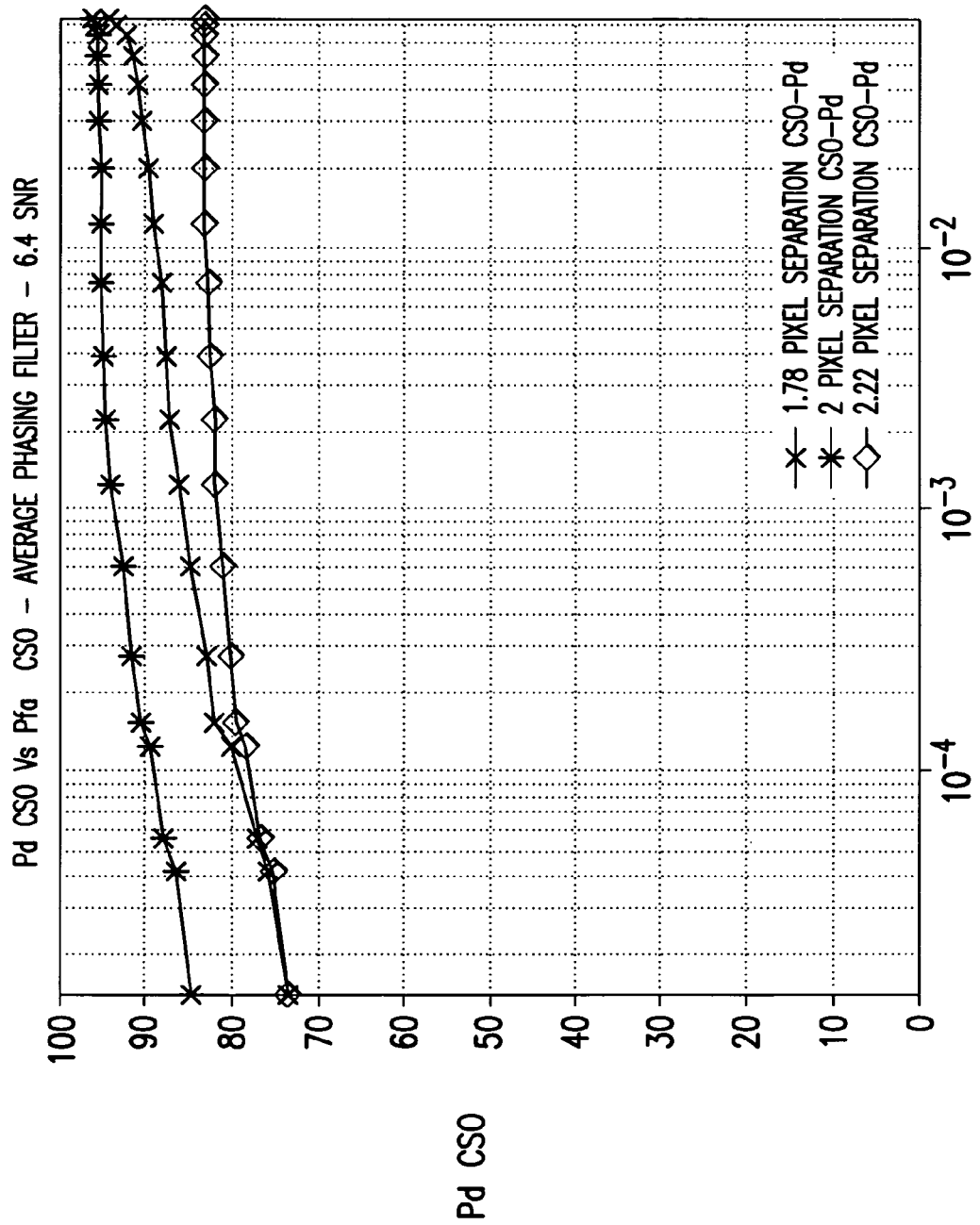
FIG. 6 is a graph illustrating ROC performance of CSO target detection.
Figure 7:
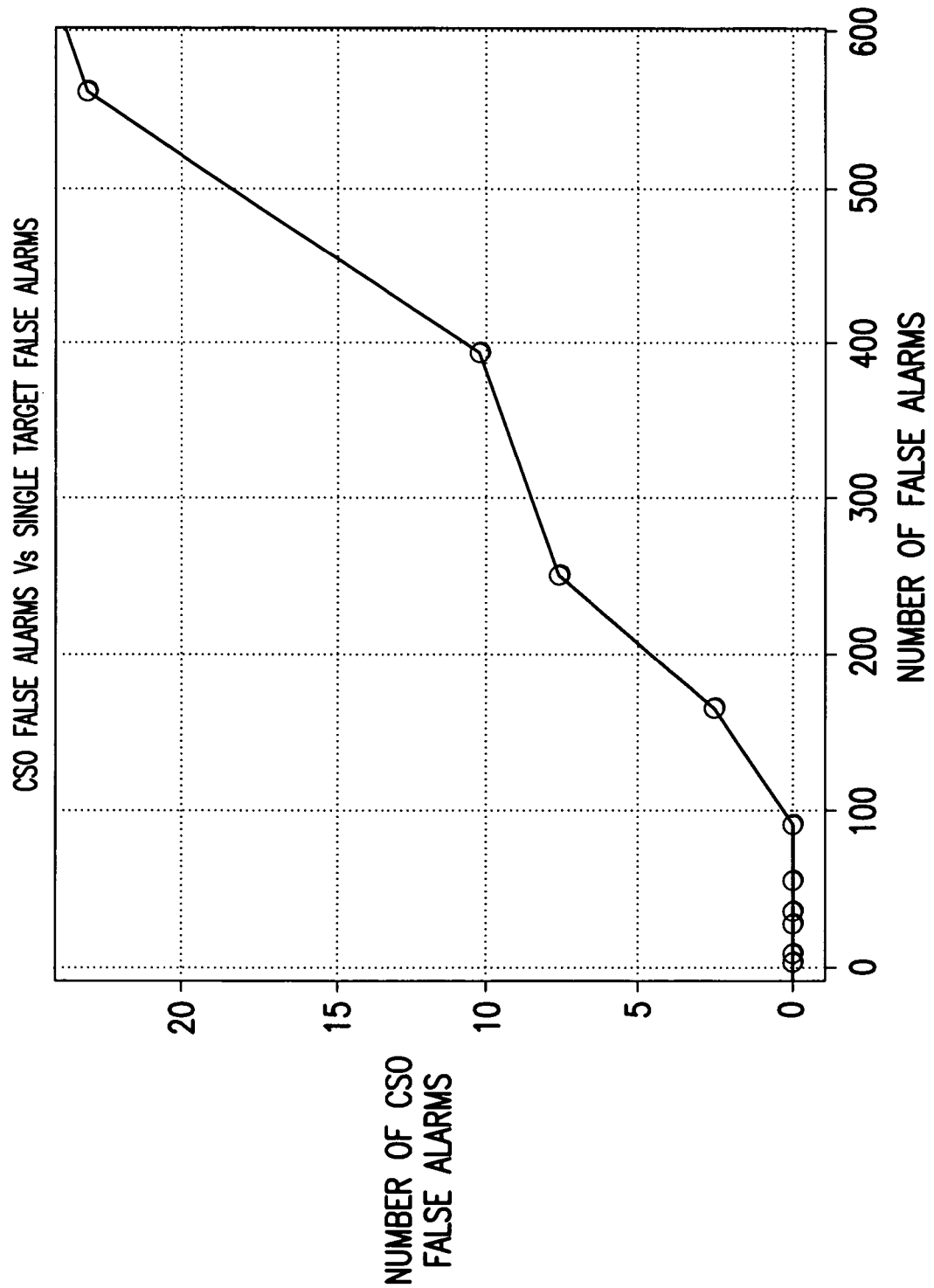
FIG. 7 is a graph illustrating Pfa(CSO) vs. Pfa(Sngl).

FIG. 5 shows the ROC curves of single target detection for real single target insertion as well as for CSO target insertions at three different separations. In this case, the two targets in a CSO pair are treated as two single targets. FIG. 6 shows the ROC curves for CSO target detection at three different separations. FIG. 7 shows False-Detection number (CSO) vs. False-Detection number (Sngl). It is seen that for a same CFAR threshold, False-Detection number (CSO) is much lower than False-Detection number (Sngl). For example, False-Detection number (CSO)=0 until False-Detection number (Sngl)>98, and False-Detection number (CSO)=3 while False-Detection number (Sngl)=175.

An example from the ROC performance graph of FIG. 5, will now be described. For a threshold of CFAR=5E-4, the false detection number for a single target is 92 for a 430×430 image size, and the false detection number for CSO is zero. The performance at this CFAR level and under the condition of CFAR=5E-4, include:

Pfa(sngl)=5E-4
Pfa(CSO)=0;
and
Pd (sngl)=93% if it is a single target in reality;
Pd(CSO)=0.07% if it is a single target in reality;
Pd (sngl)=84~90% if it is a CSO target in reality;
Pd(CSO)=71~81% if it is a CSO target in reality;

Single Target Detection

For a threshold resulting in Pfa=5-E4, we have Pd=93%. The false detection number for single target is 92. That is, for each time frame, there is 93% probability that the single target will be above the threshold. That is, we have 92+1=93 detections. However, the probability of declaring a target is only:

$Pdec=93/93=1\%$.

It is very low. That is why we need a reliable tracker with good discrimination features to eliminate most of the false detections to improve Pdec, and the tracking task in general will take quite a long time (many time frames later) to be accomplished.

CSO Target Detection

For a threshold resulting in Pfa=5E-4, we have Pfa(CSO) =0 and Pd(CSO)=81% if the CSO separation is about 2 pixels. Since the false detection number for CSO is zero, for each time frame, we have Pdec=Pd=81%.

It is much higher than the Pdec for single targets. Moreover, within a two-frame time window, if we use a one-out-of-two (including two-out-of-two) hits sequence strategy, we have Pdec=(1−0.19*0.19)*100=96.4%.

Within a three-frame time window, if we use a one-out-of-three (including two-out-of-three and three-out-of-three) hits sequence strategy, we have Pdec=(1−0.19^3)*100=99.3%.

That is, if at least one (including two or three) of the three frames has a CSO pair detection, the Pdec is as high as 99.3%—an almost sure event. It is a quite high Pdec to declare a target. Therefore, by using a simple one-out-three time window sequence, within a few time frames from the start of the detection mission, we can already declare the CSO target with a quite high Pdec (>99%). Furthermore, the 3×3 window CSO detector can provide accurate target location within a refined small regional area, which makes the tracker's task much easier without needing to try to find and track the targets among the whole image.

On the other hand, if none of the three frames has a CSO pair detection, the probability calculation tells us that there is 99.3% probability that there is no CSO in the scene (image)—again an almost sure event. Then we can concentrate all our resources on single target tracking.

Figure 8:
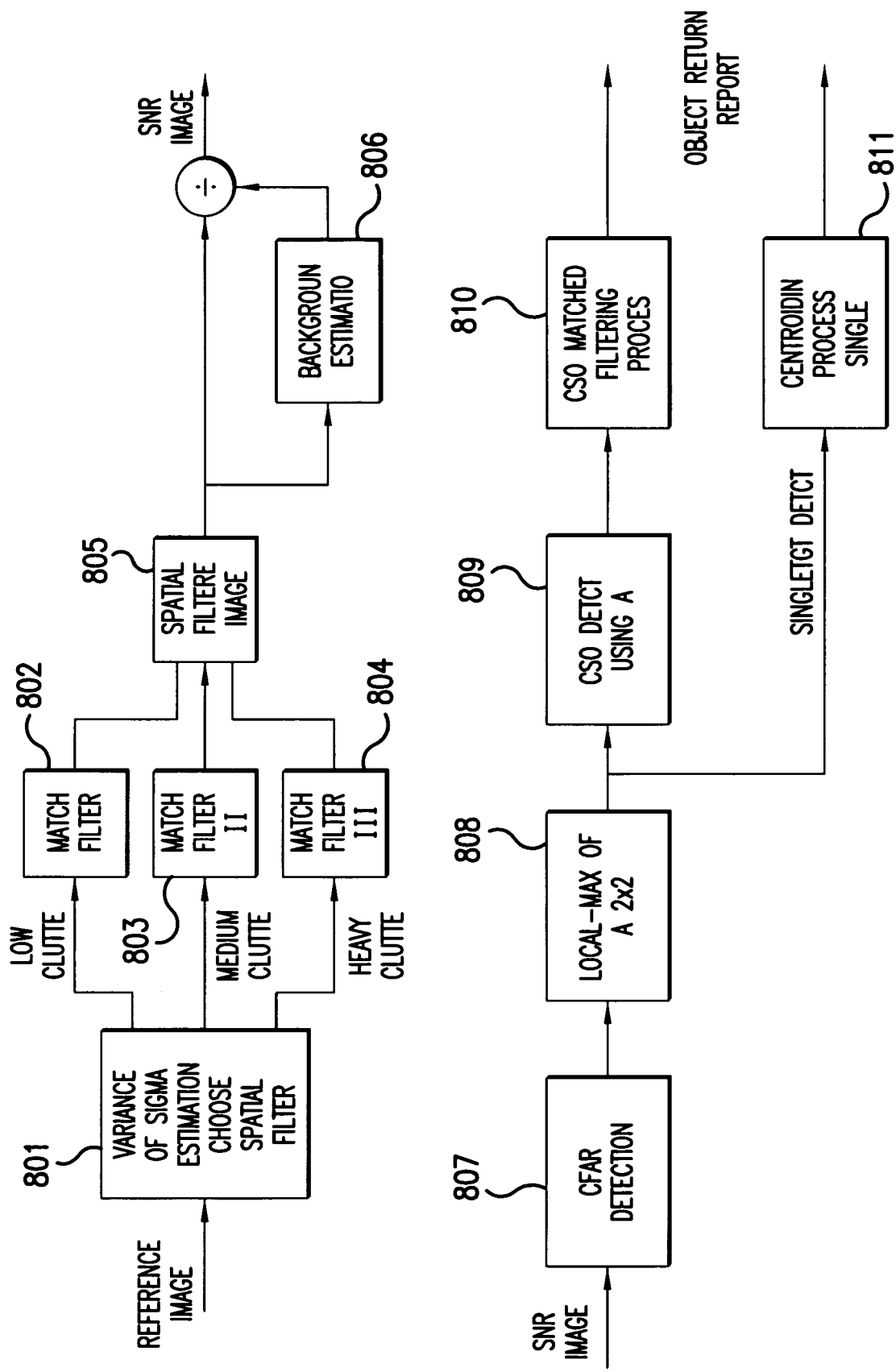
FIG. 8 is a block diagram of the two-stage CSO detection process.

Referring now to FIG. 8, a block diagram illustrates a two-stage CSO detection process for a SNR image. The SNR image is obtained from a reference image that undergoes spatial filtering. In step 801 a variance of sigma estimation is used to chose a spatial filter. Depending upon the presence of low, medium, or heavy clutter, matched filters 802, 803 or 804 are employed. A spatially filtered image is obtained in step 805, and it is compared to a background estimation in step 806 to obtain the SNR image. In step 807, a CFAR detection is performed on the SNR image, and in step 808 a local-max algorithm is applied to each 2×2 area of the image.

The two stage CSO detection process of FIG. 8 preferably includes a 3×3 CSO window discriminant function 809 that is used as the first stage of CSO detection. As discussed above, for the same threshold level, the CSO detections are a sub-set within the set of all the single target detections. The Pfa (CSO) is much smaller than Pfa (Sngl). In many cases, Pfa (CSO)=0, which allows us to know (with high probability) if there is a CSO in the scene.

The multiple detections (2 or 3) inside the CSO window of CSO detection step 809 also can provide us with useful CSO information with approximate accuracy such as CSO orientation and separation, etc.

Similar to an ATR approach, a second-stage multiple CSO matched filters processing 810 can be applied at different orientations, separations, and. sub-pixel phases. With the above information, we save computational times by restricting the orientation and separation of the CSO filters. The CSO target orientation, separation, and sub-pixel phase can be determined by the filter with maximum output intensity among the multiple filters applied in the filtering process 810.

The targets' sub-pixel centroiding locations can also be estimated from filtering or centroiding process 811. With accurate target centroid estimates, we can further estimate targets' radiometric peaks for targets with corner or edge phases.

In summary, the present invention provides:
1). CSO detection using a 3×3 CSO window as the discriminant function, and the scene is filtered using a traditional matched filter method for single target with a regional 2×2 local-max scheme.
2). The 3×3 CSO widow discriminant function serves as the first-stage of CSO detection, and allows us to know (with high probability) whether there is a CSO in the scene or not. If there is a CSO in the scene, the CSO window discriminant function can further tell us where the CSO is located in the scene with high probability and within a refined regional area.
3). FIG. 5 illustrates a traditional single target detection example, Pd=93% and Pfa =5E-4. In this case, the probability for declaring a single target is very low: Pdec=1%. Nevertheless, at the same detection threshold level, if there is a CSO target-pair inside the scene, the Pdec is much higher. Pdec=81% for any single frame, and Pdec=99.3% by using a simple one-out-three time window sequence test.
4). The 3×3 window CSO detector can provide accurate target location within a refined small regional area, which makes the tracker's task much easier without needing to try to find and track the targets among the whole image. On the other hand, if none of the three frames has a CSO pair detection when using a one-out-of-three sequence persistency test, the probability calculation tells us that there is 99.3% probability that there is no CSO in the scene (image)—an almost sure event. Then we can concentrate all our resources on single target tracking.
5). Multiple detections (2 or 3 of FIG. 3D) inside the CSO window provide us with useful CSO information with approximate accuracy such as CSO orientations and separations, etc.
6). Similar to the ATR approach, a second-stage multiple CSO matched filters of FIG. 8 can be applied to estimate the CSO targets' orientation, separation, and sub-pixel phases. With the available CSO information obtained from the first-stage 809 using a regional window discriminant function, we save computational times by restricting the orientation and separation of the CSO filters.
7). Finally, the detected CSO sub-pixel centroiding locations may also be estimated with higher accuracy using the multiple CSO matched filters approach of FIG. 8. With accurate target centroid estimates, we can further estimate targets' radiometric peaks for targets with corner or edge phases.

I claim:

1. A method for detecting closely spaced objects in a scene, comprising the steps of:

capturing an image of the scene;

running a first algorithm, having a predetermined constant false alarm rate (CFAR), that determines whether there are any single object detections within the scene by identifying multiple detections within pixel regions of predetermined size of said image;

removing, from the image, pixels associated with the identified multiple detections within said pixel regions, running a second algorithm, having substantially the same predetermined CFAR and having at least one regional window corresponding to a matrix of pixels, where said second running determines, after said removing, whether there are closely spaced objects within that portion of the image contained in the regional window; and recording the closely spaced objects detected within the regional window.

2. A method for detecting closely spaced objects according to claim 1 which further includes the step of reporting the closely spaced objects.

3. A method for detecting closely spaced objects according to claim 1 wherein the regional window is a moving window that moves across the image.

4. A method for detecting closely spaced objects according to claim 3 wherein the regional window moves from left-to-right and top-to-bottom across the image.

5. A method for detecting closely spaced objects according to claim 1 wherein the image includes a plurality of different regional windows and an index is made of the detections within each regional window.

6. A method for detecting closely spaced objects according to claim 5 wherein the index includes detections grouped by row and column locations.

7. A method for detecting closely spaced objects according to claim 1 wherein the regional window includes at least a 3×3 matrix.

8. A method for detecting closely spaced objects according to claim 1 wherein the regional window includes at least a 5×5 matrix.

9. A system for detecting closely spaced objects in a scene, comprising:

a sensor that captures an image of the scene; and a processor that runs a first algorithm, having a predetermined constant false alarm rate (CFAR), which determines whether there are any single object detections within the scene by identifying multiple detections within pixel regions of predetermined size of said image, removes, from the image, pixels associated with the identified multiple detections within said pixel regions, and runs a second algorithm, having substantially the same predetermined CFAR and having at least one regional window corresponding to a matrix of pixels, that determines, after the processor removes, whether there are closely spaced objects within that portion of the image contained in the regional window; and a memory that records the closely spaced objects within the regional window.

10. A system for detecting closely spaced objects according to claim 9 which further includes a reporting device responsive to said memory.

11. A system for detecting closely spaced objects according to claim 9 wherein the regional window is a moving window that moves across the image.

12. A system for detecting closely spaced objects according to claim 11 wherein the regional window moves from left-to-right and top-to-bottom across the image.

13. A system for detecting closely spaced objects according to claim 9 wherein the image includes a plurality of different regional windows and further wherein the memory includes an index of the detections within each regional window.

14. A system for detecting closely spaced objects according to claim 13 wherein the index includes detections grouped by row and column locations.

15. A system for detecting closely spaced objects according to claim 9 wherein the regional window includes at least a 3×3 matrix.

16. A system for detecting closely spaced objects according to claim 9 wherein the regional window includes at least a 5×5 matrix.

17. A system for detecting closely spaced objects according to claim 9 wherein the sensor includes an infrared focal plane array.

18. The system of claim 9, wherein said first algorithm includes a local-max algorithm and further wherein said processor determines sub-pixel centroiding locations of objects within the scene based on results of the local-max algorithm.

19. The method of claim 1, where said first and second running are carried out with a processor.

20. The method of claim 1, where said capturing and image includes capturing an image with an imaging sensor.

21. The system of claim 9, the system further including matched filters that determine the orientation or separation of the closely spaced objects by performing multiple detections within the at least one regional window.

22. The method of claim 1, where said pixel regions of predetermined size are 2×2 pixel regions.

23. The system of claim 9, where said pixel regions of predetermined size are 2×2 pixel regions.

* * * * *

UNITED STATES PATENT AND TRADEMARK OFFICE
CERTIFICATE OF CORRECTION

PATENT NO. : 7,646,886 B2
APPLICATION NO. : 11/126261
DATED : January 12, 2010
INVENTOR(S) : Hai-Wen Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1324 days.

Signed and Sealed this

Sixteenth Day of November, 2010

David J. Kappos
*Director of the United States Patent and Trademark Office*